(12) United States Patent
Roloff

(10) Patent No.: US 6,499,694 B2
(45) Date of Patent: Dec. 31, 2002

(54) DRIVE MECHANISM FOR AN AIRCRAFT LANDING GEAR BAY DOOR

(75) Inventor: Gerd Roloff, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/909,149

(22) Filed: Jul. 19, 2001

(65) Prior Publication Data

US 2002/0008178 A1 Jan. 24, 2002

(30) Foreign Application Priority Data

Jul. 19, 2000 (DE) .......................................... 100 34 989

(51) Int. Cl.$^7$ ................................................ B64C 1/14
(52) U.S. Cl. ............................... 244/129.4; 244/129.5; 244/100 R; 244/102 R
(58) Field of Search ........................ 244/100 R, 102 R, 244/102 A, 102 SL, 129.4, 129.5

(56) References Cited

U.S. PATENT DOCUMENTS

| 2,457,625 A | * | 12/1948 | Amiot ...................... 244/129.5 |
| 2,670,156 A | * | 2/1954 | Clark et al. .............. 244/102 R |
| 3,718,171 A | * | 2/1973 | Godwin ...................... 160/188 |
| 3,832,804 A | * | 9/1974 | Goldsmith ................ 244/129.5 |
| 5,482,228 A | * | 1/1996 | Hoshino .................. 244/102 A |
| 5,823,473 A | * | 10/1998 | Odell et al. .............. 244/129.5 |
| 6,352,221 B1 | * | 3/2002 | Sakurai ................... 244/102 R |

FOREIGN PATENT DOCUMENTS

| DE | 100 34 989 C1 | * | 7/2000 | ............ B64C/25/00 |
| EP | 0 564 772 A1 | * | 2/1993 | ............ B64C/25/12 |

* cited by examiner

*Primary Examiner*—Charles T. Jordan
*Assistant Examiner*—Stephen A Holzen
(74) *Attorney, Agent, or Firm*—W. F. Fasse; W. G. Fasse

(57) ABSTRACT

A door arrangement for an aircraft landing gear bay includes a drive mechanism that is asymmetrically located on one side of the door, but symmetrically applies the opening and closing torque to a longitudinally centered location on the pivot axis of the door, to avoid twisting, bending or jamming of the door. The door includes a cover plate mounted on a support frame and a hollow pivot shaft. The door pivots about the axis of the pivot shaft, which is supported in two pivot bearings. The drive mechanism applies a torque to a drive shaft that extends coaxially into the hollow pivot shaft. The drive shaft is connected to the hollow pivot shaft by a torque-transmitting connection only at a location centered along the length of the pivot shaft between the two pivot bearings.

19 Claims, 2 Drawing Sheets

DRIVE MECHANISM FOR AN AIRCRAFT LANDING GEAR BAY DOOR

PRIORITY CLAIM

This application is based on and claims the priority under 35 U.S.C. §119 of German Patent Application 100 34 989.7, filed on Jul. 19, 2000, the entire disclosure of which is incorporated herein by reference.

FIELD OF THE INVENTION

The invention relates to a drive or operating mechanism for opening and closing the flap door or doors of the landing gear bay of an aircraft.

BACKGROUND INFORMATION

The landing gear of large transport aircraft are typically retractable into a landing gear bay or well, and the opening of this landing gear bay is then covered by a flap door arrangement that may include one or more rather large one-piece or multi-component doors. Due to the required light-weight construction, the rather large door panels generally do not have a very high twisting stiffness, so that special considerations apply for the design of a drive or operating mechanism for opening and closing these doors. Namely, if the drive mechanism is only coupled to one side of the door, then the door will have a substantial tendency to twist or bend, especially while opening and closing due to the non-symmetrical application of force. Such twisting or bending of the door can lead to temporary or permanent malfunctions, mis-alignments, jamming, and the like.

For this reason, it has been necessary to apply the opening and closing force to each individual bay door in a symmetrical arrangement, i.e. at a location at the center of the door or the center of the longitudinal edge of the door. To achieve this, various combinations of actuators such as hydraulic motors or jacks have been conventionally installed directly in the landing gear bay, with further transmission arrangements connected to the bay door or doors. Alternatively, the drive is supported on an additional mounting structure at the center of the bay door. As a further possible alternative, two separate, yet synchronized drives are respectively arranged at the two sides of each individual bay door, to apply balanced and synchronized opening and closing forces to both sides of the door so as to avoid bending or twisting thereof.

Moreover, especially in large transport aircraft, it is typical to cover the horizontal opening of the landing gear bay using a plurality of flap doors or door components that cooperate with each other. In this case, each individual door is respectively equipped with its own separate drive for operating this door.

All of the above mentioned conventionally known arrangements suffer serious disadvantages due to their rather complicated and thus sensitive and not particularly robust structures. Namely, the complicated arrangements suffer a rather high rate of operating problems, with a corresponding high requirement for inspection, maintenance and repair in order to achieve a reliable functioning of the landing gear bay doors. Moreover, efforts to reduce the degree of twisting or bending of large bay doors by instead providing a greater number of smaller bay doors, give rise to aerodynamic penalties, because the respective edges of the adjoining bay doors cause an aerodynamic resistance and have other undesirable effects on the aerodynamic flow conditions along the fuselage in the bay door area. Thus, for aerodynamic reasons, a single or integral bay door is preferred. On the other hand, as mentioned above, such large single or integral bay doors suffer the problem of a relatively low twisting stiffness, which therefore require special considerations in the design and arrangement of the drive mechanism.

It is further desirable to provide only a single door drive mechanism that applies the drive force symmetrically and particularly in a centered manner to the respective bay door, rather than providing two synchronized drives at opposite side edges of the door, for the purposes of saving weight, cost, and complexity. On the other hand, such a centered drive arrangement involves the drive itself or transmission or coupling components being located in an area of the landing gear bay that is generally "in the way" or a hindrance for other components and functions, as well as being exposed to damage by any foreign objects may enter the landing gear bay from the outside when the bay doors are open.

SUMMARY OF THE INVENTION

In view of the above, it is an object of the invention to provide a simple, yet robust drive mechanism for aircraft landing gear bay doors, especially in connection with a landing gear bay door having the lowest possible number of individual parts for covering the open area of the landing gear bay. It is a further object of the invention to provide an asymmetrical arrangement of a drive motor, actuator, or other drive prime mover, while still applying the drive force to the individual bay door in an advantageous manner to avoid twisting or bending of the door during its operation. Another object of the invention is to avoid the arrangement of the drive and transmission components in the open area of the landing gear bay to thereby avoid the danger of damage to such components by foreign bodies that might enter the landing gear bay when the bay doors are open during take-off and landing of the aircraft. The invention further aims to avoid or overcome the disadvantages of the prior art, and to achieve additional advantages, as apparent from the present specification.

The above objects have been achieved according to the invention in an operable landing gear bay door arrangement for an aircraft, wherein a door flap is supported on a pivot support shaft that is hollow along at least a partial length thereof, and preferably along the entire length thereof, and that in turn is pivotably supported in two bearings. A drive shaft extends coaxially in the hollow interior of the pivot support shaft, and is connected to the pivot support shaft by a torque-transmitting connection near the longitudinal center thereof. The drive shaft is connected to a drive such as a hydraulic motor, an electric motor, a hydraulic jack, a screw jack, or any other known type of actuator, either directly or through a gear drive, a transmission linkage, or a drive lever, or the like, so as to exert a torsional moment onto the drive shaft. This torsional moment is transmitted from the drive shaft to the pivot support shaft through the torque-transmitting connection therebetween. Along the length of the drive shaft extending coaxially in the hollow interior of the pivot support shaft, the drive shaft is not connected to the pivot support shaft, but rather is freely twistable, pivotable, and flexible therein to a limited extent, because of the provision of an annular clearance gap therebetween.

In the above manner, while the drive itself is arranged asymmetrically to one side of the bay door, the drive force is applied to the bay door at a generally centered location, so as to have a symmetrical influence on the door and thereby avoid twisting or bending thereof. The force-transmitting connection between the drive shaft and the pivot support shaft can be carried out in a positive form-locking manner or in a force-locking manner such as by a frictional or press-fit connection. The preferred connection is a form-locking connection, and may further be secured with a pin, screw, bolt or rivet.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
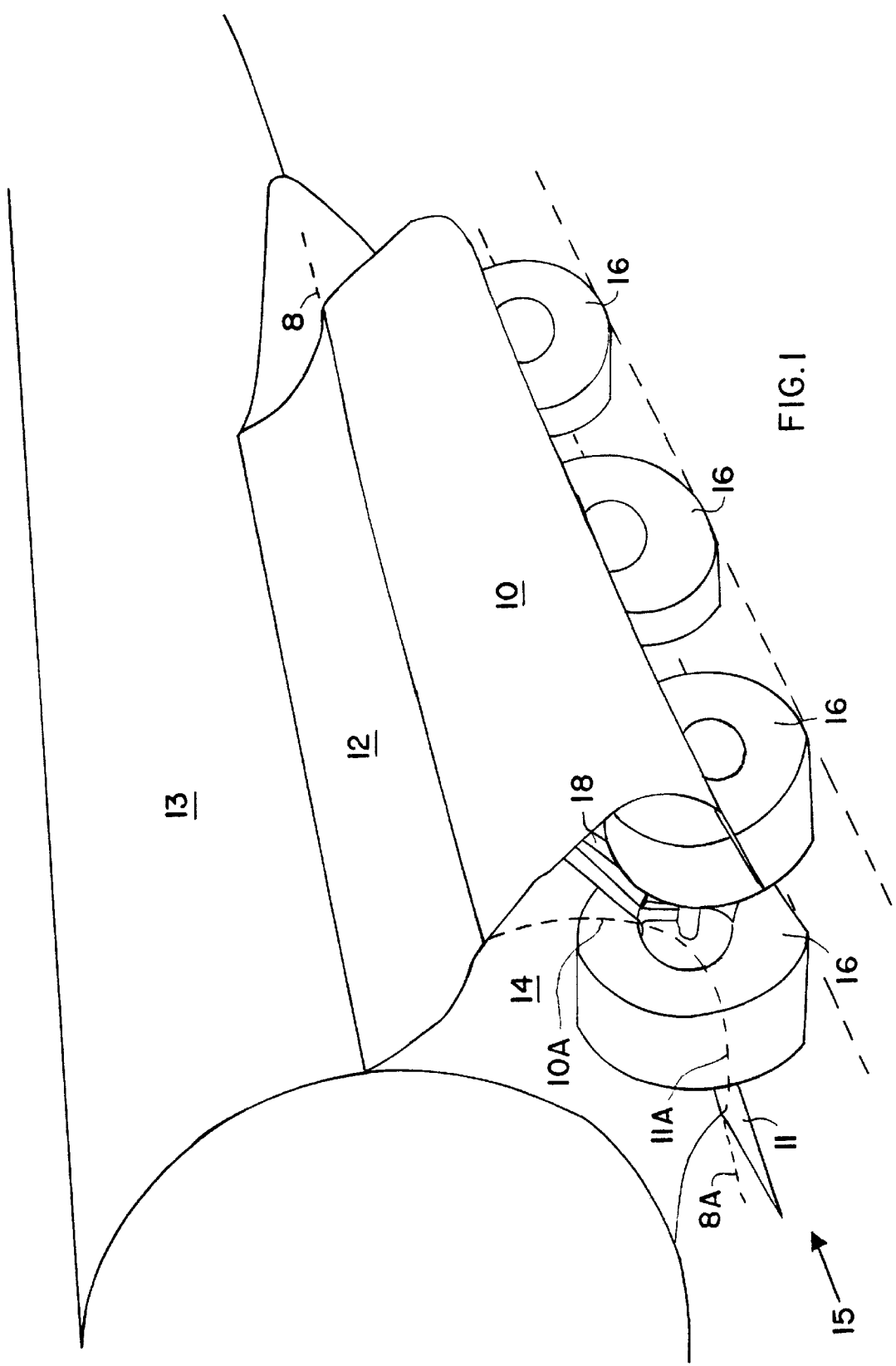
FIG. 1 is a schematic perspective view of the landing gear extended from the landing gear bay of an aircraft, with the landing gear bay doors in the open position.

In a simplified schematic perspective view, FIG. 1 generally shows an aircraft fuselage 13 with a landing gear nacelle 12 enclosing a landing gear bay 14, for receiving and housing the retractable landing gear 15 therein. FIG. 1 is merely intended to be a generalized schematic representation, while actual configurations of landing gear 15 and landing gear bay or well 14 in a landing gear nacelle 12 or directly in the belly or underside of a fuselage 13 may have any of various configurations that are conventionally known in the art. The landing gear 15 is shown in the extended position, where the landing gear wheels 16 and the landing gear struts 18 of the landing gear 15 are visible. In this condition, the landing gear bay doors 10 and 11 are open, to allow the landing gear 15 to be extended out of the landing gear bay 14.

The condition shown in FIG. 1 thus exists when the aircraft is rolling or standing on the ground, as well as during the take-off and landing phases of a flight. During the remainder of a flight, the landing gear 15 is retracted into the landing gear bay 14, and the bay doors 10 and 11 are respectively pivoted about respective pivot axes 8 and 8A, that extend substantially horizontally, by which each of the bay doors 10 and 11 is respectively connected to the landing gear nacelle 12, or generally to the fuselage 13. The doors 10 and 11 are closed to be flush with each other and the outer surface of the nacelle 12 or fuselage 13, to provide advantageous aerodynamic flow conditions. The position or contour of the doors 10 and 11 in the closed position is shown by a dashed line 10A and 11A.

As can be seen schematically in FIG. 1, the doors 10 and 11 are rather thin, curved, sheet-like components that each cover a rather large area. For weight reasons, and space reasons (e.g. to avoid encroaching on the space required by the landing gear in the retracted position in the landing gear bay 14), the doors 10 and 11 cannot have a substantial supporting structure. As a result, the doors 10 and 11 are somewhat flexible and subject to twisting or elastically bending relative to the pivot axis 8, especially when the doors 10 and 11 are in the illustrated open position, or being moved between the open and closed positions.

Figure 2:
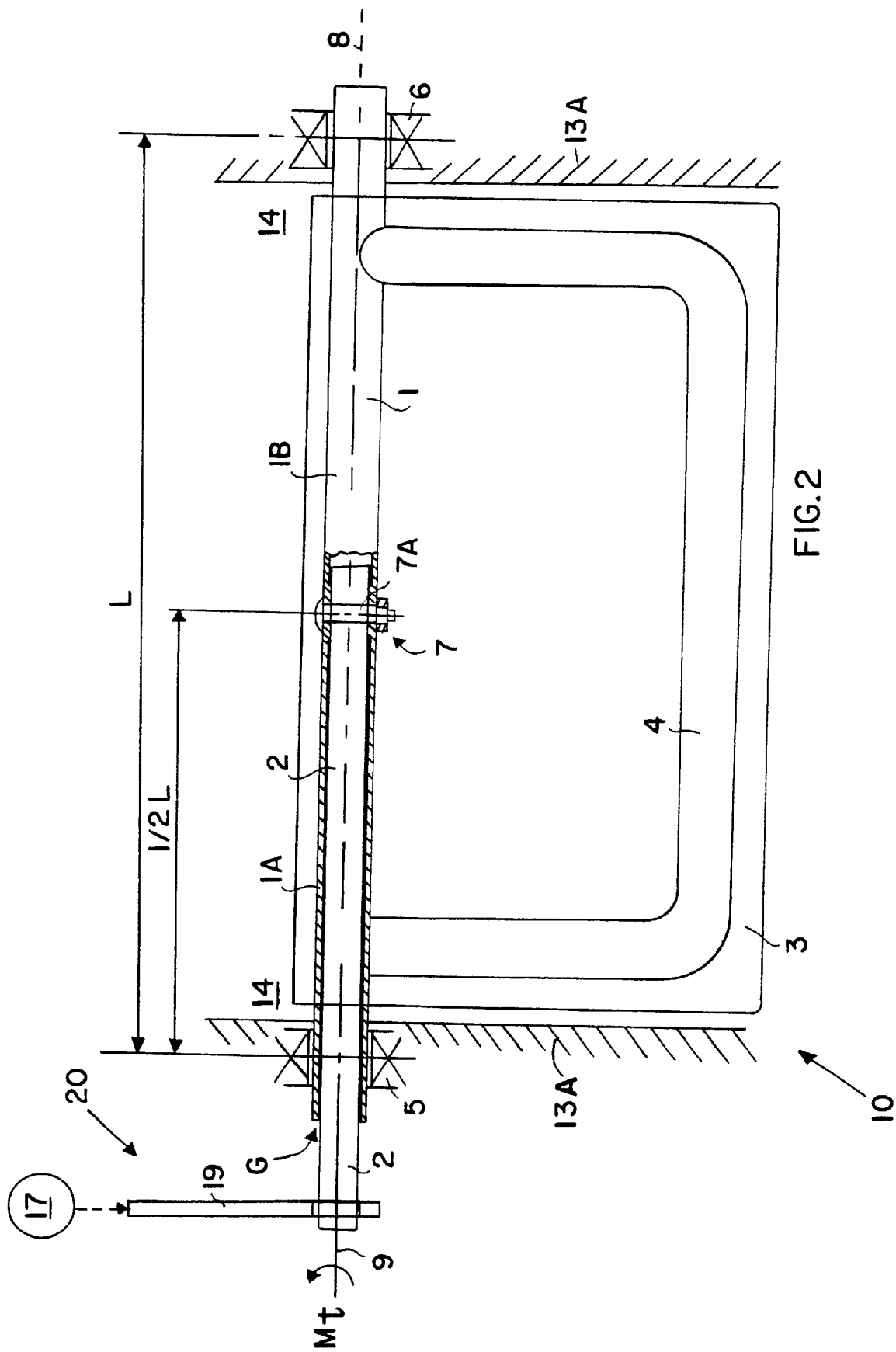
FIG. 2 is a schematic view, partially in section, of a door arrangement including an operating mechanism according to the invention, for covering a landing gear bay of an aircraft.

The construction and arrangement of the doors 10 and 11 as well as the driving or operating mechanism therefor are shown in greater detail, yet still merely schematically, in FIG. 2. Particularly, FIG. 2 shows the arrangement of the landing gear bay door 10, while the second cooperating door 11 may have a similar construction and function. Generally, the door 10 includes a door support frame 4 as well as a door cover plate 3 secured and supported on the frame 4. The frame 4 and the cover plate 3 have the necessary curvature to match the outer contour of the fuselage 13 or nacelle 12 when the doors are in the closed position. Moreover, the door support frame 4 is pivotably connected to the airframe structure of the fuselage 13 (as will be described below), so that the door 10 can be pivoted about the substantially horizontal pivot axis 8 relative to the fuselage 13. The cover plate 3 and the door support frame 4 may be made of any suitable materials conventionally used in the aircraft manufacturing art, for example aluminum alloys, and may be secured together by any conventionally known means, such as welding, riveting, or screwing, or combinations thereof.

According to the invention, the door 10 is pivotably supported by a pivot support shaft 1 to which the door support frame 4 and the door cover plate 3 are rigidly connected, for example by welding, screwing, and/or riveting, or the like. The pivot support shaft 1 thus forms a frame component along a fourth edge, namely the hinge edge or pivot edge of the door 10, while the door support frame 4 extends along the other three edges of the generally rectangular plan form of the door 10. Two opposite outer end portions of the pivot support shaft 1 are pivotally supported in respective pivot or rotation bearings 5 and 6, that are mounted to the airframe structure 13A of the fuselage 13 at two opposite sides, e.g. the forward end and the aft end, of the landing gear bay 14. The pivot axis 8 is thus defined by the lengthwise axis of the pivot support shaft 1, and extends between the center points of the two bearings 5 and 6, and substantially parallel to the longitudinal axis of the aircraft.

The pivot support shaft 1 is shown partially broken open in section, to clearly illustrate that the shaft 1 includes a hollow tubular portion 1A, and a portion 1B that may be solid, but is preferably also hollow. In other words, preferably, the entire pivot support shaft 1 is a hollow tube. The hollow construction of the pivot support shaft 1 is significant for the door drive mechanism according to the invention.

For driving, i.e. opening or closing, the bay door 10, a drive arrangement 20 is arranged asymmetrically to one side of the door 10, for example mounted in the fuselage structure to the side of the landing gear bay 14. The drive arrangement 20 provides a torsional moment $M_t$ that is to be applied to the door 10, so as to pivot the door 10 about the pivot axis 8. In this regard, the drive arrangement 20 includes a drive 17, which may be any conventionally known form of actuator or driver, such as a hydraulic motor, an electric motor, a hydraulic jack, a screw jack, or the like, which either directly provides the torsional moment or torque $M_t$, or exerts a drive force through a drive linkage or transmission 19, for example a gear drive, a rod linkage, or a drive lever 19.

The arrangement further includes a drive shaft 2 that extends within the hollow interior of the hollow portion 1A of the pivot support shaft 1. The drive shaft 2 extends along a drive shaft axis 9 that is preferably coaxial with the pivot axis 8 of the pivot support shaft 1. The drive shaft 2 protrudes out from the hollow pivot support shaft 1 at one end thereof, e.g. the end supported by the bearing 5, and extends within the shaft 1 at least to a central region thereof, for example the central one quarter portion, or preferably the central one fifth portion, or preferably within a range of ±5% from the center with regard to the longitudinal length L of the shaft 1. Particularly, most preferably, the drive shaft 2 extends somewhat beyond the length-wise center of the pivot support shaft 1, because it is connected in a rotational force or torque transmitting manner to the shaft 1 preferably at the lengthwise center thereof, as will be discussed next. The other end of the drive shaft 2 protruding out of the pivot support shaft 1 is connected to the drive arrangement 20, for example to the drive 17 via the drive lever 19, which thereby exerts the torsional moment or torque $M_t$, to the drive shaft 2, when the door 10 is to be pivoted open or closed.

The torsional moment or torque $M_t$ of the drive shaft 2 is transmitted to the pivot support shaft 1 via a rotational force or torque transmitting connection 7 between the shaft 2 and the shaft 1, preferably directly at the lengthwise center of the shaft 1 relative to the lengthwise dimension of the door 10, or relative to the dimension of the shaft 1 between the bearings 5 and 6. This connection 7 may be a form-locking connection or a force-locking connection. For example, the free end of the drive shaft 2 may be provided with splines or a key slot or the like, which mates with a corresponding spline arrangement or a key provided on the inner surface of the hollow portion 1A of the shaft 1 at the lengthwise center thereof. Alternatively, the free end of the drive shaft 2 may simply be frictionally press-fit into a constricted portion of the hollow inner diameter of the shaft 1 at the lengthwise center thereof. In any event, it is further additionally preferred to provide a mechanical fastener or connector 7 such as a bolt, pin, rivet or stud that extends through aligning holes provided transversely through the shaft 1 and the shaft 2, to ensure a positive fixed and locked connection between the end of the drive shaft 2 and the center of the pivot support shaft 8, in a manner that transmits torque from the drive shaft 2 to the pivot support shaft 1, and further prevents any rotation or axial sliding shifting of these two shafts 1 and 2 relative to each other.

It should be understood that the hole passing transversely through the shafts 1 and 2 is preferably a radially bored hole extending perpendicularly through the common pivot axis 8 of the shaft 1 and the axis 9 of the shaft 2. Alternatively, this hole could be any manner of opening or recess into which a mechanical fastening element 7A can be inserted. The fastening element 7A may be a removable fastener, such as a screw or bolt, or may be a permanent fastener such as a rivet. Moreover, the fastener 7A could be the only means providing the connection between the shaft 2 and the shaft 1, i.e. without any other splining, keying or the like, but for reliability reasons such additional form-locking means are preferably additionally provided.

In the above arrangement, it is preferred that the outer diameter of the drive shaft 2 is slightly smaller than the inner diameter of the hollow interior of the hollow portion 1A of the pivot support shaft 1, so as to allow a small annular free play clearance or gap G therebetween. This clearance allows the drive shaft 2 to be easily inserted into the hollow portion 1A of the shaft 1, for assembly or disassembly of the arrangement, and also ensures a symmetrically balanced force application to the door 10, as follows. Even though the drive arrangement 20 is located asymmetrically on one side of the door 10, the rotational torque is applied to the door 10 through the connection 7 at a location centered along the longitudinal length of the pivot axis 8 thereof, namely at a location at a distance of ½ L from the center of the bearing 5, where L is the distance between the centers of the two bearings 5 and 6. This torque application to the door 10 is achieved through the connection 7, preferably including the mechanical fastener 7A, between the drive shaft 2 and the pivot support shaft 1, as described above.

Due to the slight annular clearance or gap G between the outer diameter of the drive shaft 2 and the inner diameter of the hollow portion 1A of the pivot support shaft 1, it is ensured that the only torque transmission between the shaft 2 and the shaft 1 occurs directly at the torque transmitting connection 7. Thus, any torsional twisting of the door 10, and particularly of the pivot support shaft 1 along its length, would be independent of the drive shaft 2 along the length of the drive shaft 2, except directly at the center point of the pivot support shaft 1 that is fixed to the drive shaft 2 by the connection 7. Due to the lightweight construction, as described above, some twisting or bending of the door 10, i.e. the support frame 4, the cover plate 3, and the pivot support shaft 1, is expected to occur and is acceptable during the operation of the door 10.

What is significant, is that the operating torque is applied from the drive shaft 2 to a symmetrically located center region of the pivot support shaft 1 by the connection 7. Thus, the behavior of the door about this connection 7 (e.g. the twisting or bending tendency of the shaft 1, the frame 4 and the cover plate 3) will be symmetrical In order to assure symmetrical torsional or twisting behavior of the shaft 1, it is preferred that the entire shaft is a uniform hollow shaft, i.e. that the hollow portion 1A extends along the entire shaft 1, in other words that the portion 1B is also hollow. It is not significant for this symmetrical force application, whether the drive shaft 2 is a solid shaft or a hollow shaft. For weight reduction reasons, it may be preferred to provide a hollow drive shaft 2, as long as the required torsional strength thereof can be achieved.

The above described arrangement of an asymmetrical or single laterally located drive arrangement 20 that provides a symmetrically centered torque application onto the landing gear bay door 10 achieves several advantages. First, the entire drive arrangement 20 is arranged out of the open area of the landing gear bay 14 itself. Thereby the entire drive arrangement 20 is protected from foreign object damage, that might otherwise occur, for example from stones or the like being thrown up by the landing wheels 16 into the landing gear bay 14 from the runway during the take-off or landing of the aircraft. Furthermore, the drive arrangement 20 will not present any obstacle or hindrance to the location and operation of the landing gear itself, or other components to be installed in the landing gear bay 14.

The very simple arrangement of a single drive mechanism for a respective bay door 10, rather than two synchronized drive mechanisms on opposites sides of the door, represents a weight, cost, and complexity reduction, and achieves a greater reliability and reduced maintenance and repair requirements.

Due to the symmetrically centered torque introduction into the bay door 10, it is ensured that the opening and closing forces exerted by the drive mechanism on the one hand, as well as the reaction force and external forces (e.g. aerodynamic forces) exerted by the door 10 back onto the drive mechanism, are symmetrically balanced and do not tend to twist and jam the door 10. For this reason, it is possible to provide fewer larger doors instead of a greater number of smaller doors. This also increases the reliability of the proper functioning of the door 10.

By providing a larger one-piece bay door 10, there are fewer joints and gaps, which will achieve an improved aerodynamic performance when the door is (or doors are) closed. It is also possible to connect a single drive arrangement 20 through appropriate drive transmission arrangements to two landing gear bay doors (e.g. 10 and 11) that are to operate together or in cooperation.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A door arrangement for selectively covering a landing gear bay of an aircraft, comprising:
   a bay door;
   a pivot support shaft connected to said bay door, wherein at least a hollow portion of said pivot support shaft has a hollow interior;
   two pivot bearings pivotally supporting said pivot support shaft so that said bay door and said pivot support shaft are together pivotable about a lengthwise pivot axis of said pivot support shaft;
   a drive shaft that extends in said hollow interior of said pivot support shaft from a first end of said pivot support shaft at least to a lengthwise central region of said pivot support shaft;
   a torque-transmitting connection between said drive shaft and said pivot support shaft at a location within said lengthwise central region of said pivot support shaft; and
   a drive arrangement that is connected to said drive shaft and adapted to apply a torque to said drive shaft.

2. The door arrangement according to claim 1, wherein said drive arrangement is located asymmetrically only on one side of said bay door adjacent to said first end of said pivot support shaft.

3. The door arrangement according to claim 1, wherein said bay door comprises a door support frame connected rigidly to said pivot support shaft, and a door cover panel connected rigidly to said door support frame.

4. The door arrangement according to claim 1, wherein said drive shaft has a drive shaft axis that extends coaxially along said pivot axis within said hollow interior of said pivot support shaft.

5. The door arrangement according to claim 1, wherein said torque-transmitting connection is a form-locked connection.

6. The door arrangement according to claim 5, wherein said form-locked connection comprises an interengaging splined connection or keyed connection of an exterior surface of a portion of said drive shaft and an interior surface of a portion of said hollow interior of said pivot support shaft at said lengthwise central region.

7. The door arrangement according to claim 1, wherein said torque-transmitting connection is a force-locked connection.

8. The door arrangement according to claim 7, wherein said force-locked connection comprises a frictional press-fit connection between an exterior surface of a portion of said drive shaft and a constricted interior surface portion of said hollow interior of said pivot support shaft at said lengthwise central region.

9. The door arrangement according to claim 1, wherein said torque-transmitting connection comprises a mechanical fastener that extends through a hole that passes transversely through said pivot support shaft and said drive shaft in said lengthwise central region and fixedly secures said drive shaft to said pivot support shaft in said lengthwise central region.

10. The door arrangement according to claim 9, wherein said mechanical fastener comprises a bolt.

11. The door arrangement according to claim 9, wherein said mechanical fastener comprises a rivet.

12. The door arrangement according to claim 1, wherein there is an annular free clearance gap between an outer surface of said drive shaft and an inner surface of said hollow interior of said pivot support shaft, and said free clearance gap extends along said drive shaft and does not permit torque-transmission between said drive shaft and said pivot support shaft except at said torque-transmitting connection in said lengthwise central region.

13. The door arrangement according to claim 1, wherein the entirety of said pivot support shaft is hollow with said hollow interior extending therein.

14. The door arrangement according to claim 1, wherein said lengthwise central region of said pivot support shaft is centered on a lengthwise length of said pivot support shaft between said two pivot bearings, and wherein said drive shaft has a length extending within said hollow interior that is greater than one-half of said lengthwise length of said pivot support shaft.

15. The door arrangement according to claim 1, wherein said lengthwise central region has a length of at most one-quarter of a lengthwise length of said pivot support shaft between said two pivot bearings, and is centered between said two pivot bearings.

16. The door arrangement according to claim 1, wherein said pivot support shaft has a lengthwise center between said two pivot bearings, and said location of said torque-transmitting connection is displaced away from said lengthwise center by no more than ±5% of a length of said pivot support shaft between said two bearings.

17. The door arrangement according to claim 1, wherein said location of said torque-transmitting connection is at a lengthwise center of said pivot support shaft between said two pivot bearings.

18. The door arrangement according to claim 1, wherein said drive arrangement comprises a primary drive and a drive transmission mechanism connecting said drive to an end portion of said drive shaft protruding out of said hollow interior from said first end of said pivot support shaft.

19. In an aircraft including a fuselage, a landing gear bay, a landing gear that is selectively retractable into and extendable from said landing gear bay, and an operable door arrangement for selectively opening and closing said landing gear bay, an improvement in said operable door arrangement comprising:
   a bay door;
   a pivot support shaft connected to said bay door, wherein at least a hollow portion of said pivot support shaft has a hollow interior;
   two pivot bearings pivotally supporting said pivot support shaft so that said bay door and said pivot support shaft are together pivotable about a lengthwise pivot axis of said pivot support shaft;
   a drive shaft that extends in said hollow interior of said pivot support shaft from a first end of said pivot support shaft at least to a lengthwise central region of said pivot support shaft;
   a torque-transmitting connection between said drive shaft and said pivot support shaft at a location within said lengthwise central region of said pivot support shaft; and
   a drive arrangement that is connected to said drive shaft and adapted to apply a torque to said drive shaft.

* * * * *